(12) United States Patent
Kreuter

(10) Patent No.: US 6,202,607 B1
(45) Date of Patent: Mar. 20, 2001

(54) ELECTROMAGNETICALLY OPERATING DEVICE FOR ACTUATING A VALVE

(75) Inventor: Peter Kreuter, Aachen (DE)

(73) Assignee: META Motoren- und Energietechnik GmbH (DE)

( * ) Notice: Subject to any disclaimer, the term of this patent is extended or adjusted under 35 U.S.C. 154(b) by 0 days.

(21) Appl. No.: 09/368,660

(22) Filed: Aug. 5, 1999

(30) Foreign Application Priority Data

Aug. 5, 1999 (DE) .............................. 198 35 402

(51) Int. Cl.$^7$ ........................................ F01L 9/04
(52) U.S. Cl. ...................... 123/90.11; 251/129.2; 251/279
(58) Field of Search ............... 123/90.11, 90.15; 251/129.16, 129.2, 279, 280; 335/266, 267, 268

(56) References Cited

U.S. PATENT DOCUMENTS

| | | | | |
|---|---|---|---|---|
| 2,928,584 | * | 3/1960 | Foster ........................... | 251/129.2 |
| 4,455,543 | * | 6/1984 | Pischinger et al. .............. | 335/266 |
| 4,515,343 | * | 5/1985 | Pischinger et al. .............. | 123/90.11 |
| 4,535,817 | * | 8/1985 | Steiger ............................ | 251/280 |
| 4,614,170 | * | 9/1986 | Pischinger et al. .............. | 123/90.11 |
| 4,682,574 | * | 7/1987 | Kreuter ........................... | 123/90.11 |
| 4,715,331 | * | 12/1987 | Kreuter ........................... | 123/90.11 |
| 4,715,332 | * | 12/1987 | Kreuter ........................... | 123/90.11 |
| 4,719,882 | * | 1/1988 | Kreuter ........................... | 123/90.11 |
| 5,080,323 | * | 1/1992 | Kreuter ........................... | 123/90.11 |
| 5,117,213 | * | 5/1992 | Kreuter et al. ................. | 335/266 |
| 5,131,624 | * | 7/1992 | Kreuter et al. ................. | 251/129.16 |
| 5,199,392 | * | 4/1993 | Kreuter et al. ................. | 123/90.11 |
| 5,223,812 | * | 6/1993 | Kreuter ........................... | 335/266 |

FOREIGN PATENT DOCUMENTS 30 24 109   6/1980   (DE) .

\* cited by examiner

Primary Examiner—Teresa Walberg
Assistant Examiner—Fadi H. Dahbour
(74) Attorney, Agent, or Firm—Robert W. Becker & Associates

(57) ABSTRACT

An electromagnetically operating device for actuating a valve comprises a single solenoid cooperating with an armature which cooperates by a crank system with a shaft which, in turn, is cooperating by a crank system with a valve. The fully open position and the closed position of the valve is defined by the stretched position or the folded position of its crank system. The armature, in the fully open position and in the closed position of the valve, is substantially in the same end position so that the crank system during a valve stroke moves through a dead center position.

12 Claims, 4 Drawing Sheets

ELECTROMAGNETICALLY OPERATING DEVICE FOR ACTUATING A VALVE

BACKGROUND OF THE INVENTION

Fully variable valve controls which allow to adjust the opening and closing time of the load changing valves of an internal combustion engine to the respective operational requirements, provide a considerable improvement potential with respect to reduction of the fuel consumption and pollutant contents in the exhaust gas. In spark ignition engines, for example, it is possible with the aid of such fully variable valve controls to control the output exclusively by a directed adjustment of the opening and closing times of the intake valves so that the throttle valve losses of conventional throttle valve controls can be prevented and a throttle valve can be completely eliminated.

A device of this kind is disclosed in German patent 30 24 199 C2. In this known electromagnetically operating actuating device an armature plate is rigidly connected to the valve stem whereby oppositely acting springs engage the plate so that the armature plate together with the valve forms a system able to oscillate and having a balanced position that corresponds substantially to a half open position of the valve. On both sides of the armature plate pole surfaces of two solenoids are provided which are arranged such that the contact of the armature plate at a respective one of the solenoids corresponds to the fully open position of the valve, respectively, the closed position of the valve. When the valve is, for example, in the closed position and the armature plate is in contact at the corresponding closing solenoid, the valve will oscillate upon deactivation of the closing solenoid under the force of the spring in the direction to the fully open position in which it is secured by excitation of the opening solenoid and the resulting contact at the armature plate at the pole surface of the solenoid. The known device, however, is relatively complicated because of the use of two solenoids which are to be arranged separate from one another and must be precisely controlled with respect to the correct phase. Furthermore, the valve moves with high velocity into its two end positions which due to the high impact velocities can result in acoustic and service life problems.

It is therefore an object of the invention to embody an electromagnetically operating device for valve actuation according to the aforementioned kind such that a high functional reliability can be realized while at the same time a long service life and minimal energy consumption are achieved.

SUMMARY OF THE INVENTION

The inventive device requires only a single solenoid system that secures the armature in the fully open position and the closed position of the valve. Furthermore, the use of two crank systems, i.e., an armature crank system, that defines the movement of the armature, and a valve crank system, that is rotatingly coupled to the armature crank system and defines the movement of the valve, provides the greatest possible freedom with respect to the design of the solenoid system which may have a different stroke than that of the valve. Since the valve crank system in the fully opened and fully closed position of the valve is respectively at a dead center position, the solenoid system in the end positions of the valve, respectively, its rest position is relieved of the forces of the valve springs which has a beneficial effect with regard to energy consumption and allows the use of smaller solenoids. Furthermore, an opening movement is ensured that is substantially independent of the pressure within the working chamber.

BRIEF DESCRIPTION OF THE DRAWINGS

The invention will be disclosed in the following with the aid of the schematic drawings illustrating advantageous details. It is shown in.

DESCRIPTION OF PREFERRED EMBODIMENT

Figure 1:
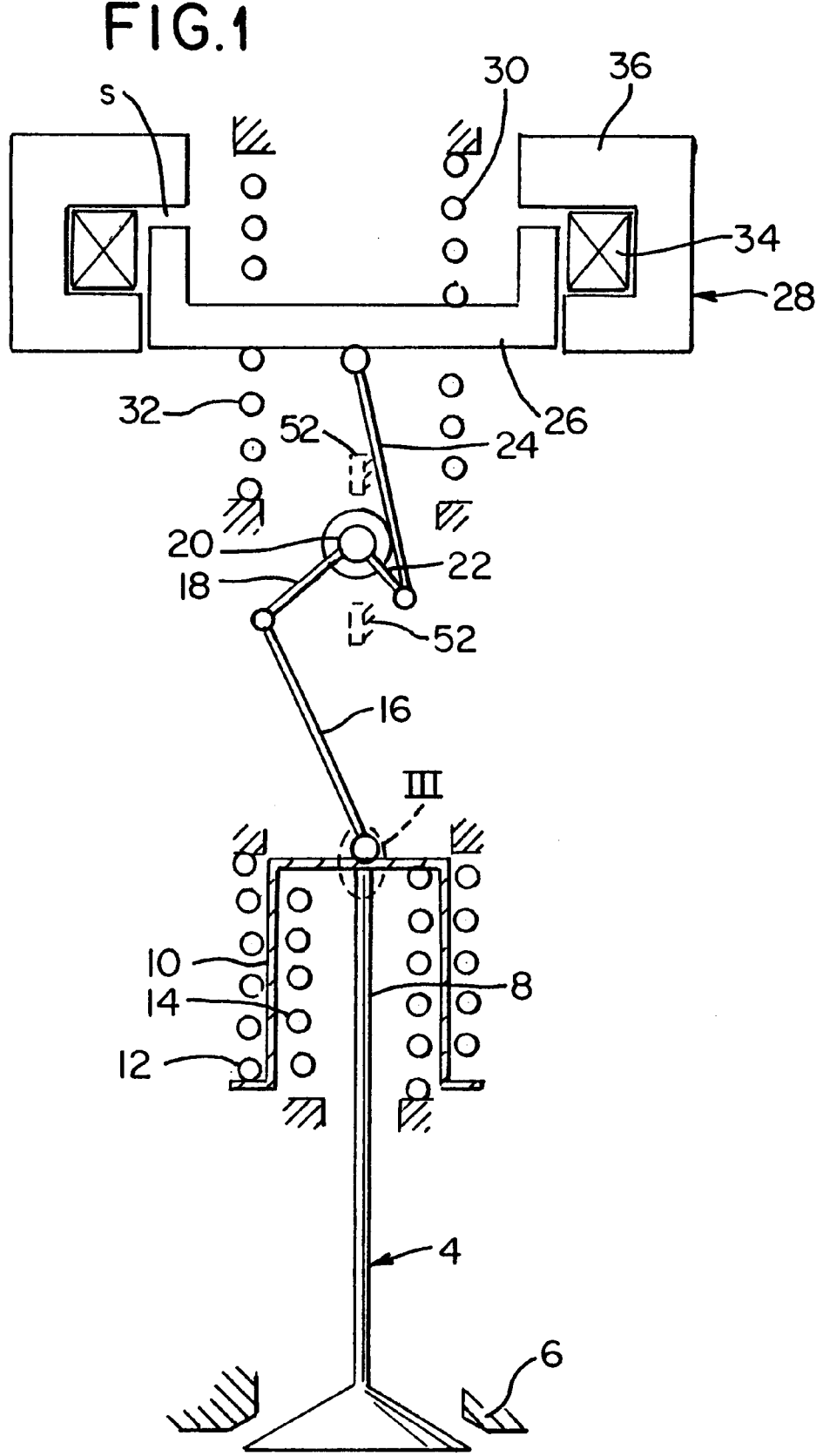
FIG. 1 a basic schematic for illustrating the basic design and function of the inventive device.

According to FIG. 1 generally known a load change valve of a valve 4 cooperates with a seat 6. The stem 8 of the valve 4 has connected thereto a spring cap 10 engaged by a valve opening spring 12 and a valve closing spring 14 operating in opposite directions. The springs 12 and 14 together with the valve 4 provide a system that is able to oscillate and has a rest position such that the valve 4 is substantially in a half open position.

A valve connecting rod 16 is connected to the stem 8 which is, in turn, connected to a valve crank 18 which is connected fixedly to the shaft 20 supported at the engine.

The shaft 20 is positioned substantially on an imaginary extension of the valve stem 8 above the valve 4 and the size and positioning of the individual components is such that, in the fully open position of the valve 4, the valve connecting rod 16 and the valve crank 18 are in a stretched position in which the valve crank 18 forms an extension of the valve connecting rod 16. In the closed position of the valve 4, the shaft 20 is rotated by 180° so that the connecting rod 16 is shortened by the valve crank 18.

An armature crank 22 is fixedly connected to the shaft 20 which in the represented embodiment has a angle of 90° to the valve crank 18. The armature crank 22 is connected by an armature connecting rod 24 to the armature 26 of a solenoid system, comprising a solenoid 28 in which the armature 26 is linearly moveable.

An armature spring 30 engages the armature 26 for forcing the armature according to FIG. 1 in the downward direction, and a further armature spring 32 engages the armature 26 for forcing the armature in the upward direction.

The armature 26 is embodied as a solenoid plunger which can be received in a recess of the solenoid core 36 which surrounds the coil 34 of the solenoid 28. In the recessed position, the solenoid plunger 26 closes the solenoid core 36 so that an annular core that surrounds the coil 34 substantially completely is formed.

The size of the aforementioned components is such that in the fully open position, representing one end position of the valve 4, the armature crank 22 is rotated from the position shown in FIG. 1 by an angle of approximately 450° in a counter clockwise direction so that the armature crank 22 is substantially horizontally positioned and such that between the solenoid core 36 and the end face of the armature 26 a gaps is formed.

In the closed position of the valve 4, the crank 22 is rotated relative to the position represented in FIG. 1 by approximately 135° in the clockwise direction so that it projects from the shaft 20 to the left substantially in a horizontal position. The armature 26 in the closed position of the valve 4 is substantially in the same position as in the fully open position of the valve 4.

The disclosed arrangement functions as follows.

When the solenoid 28 is inactive, the components are substantially in the position represented in FIG. 1 which is defined by the spring forces and in which the armature connecting rod 24 and armature crank 22 are not in a dead center position. Starting at this position, the system, upon actuation of the solenoid 28, can be excited to oscillate with the own frequency of the oscillating system so that the armature 26 with a timed precise permanent actuation of the solenoid 28 can be secured in an upper end position represented in FIG. 1 in which the valve crank 18 and the valve connecting rod 16 are in the stretched position and the valve 4 is fully opened. With a suitably controlled current supply to the solenoid 28, this stretched position is maintained whereby in this stretched position the forces of the valve springs 12 and 14 are neutralized and a force is acting on the armature which results from the forces of the armature springs 30 and 32. The resulting force forces the armature 26 according to FIG. 1 in a downward direction and counteracts the magnetic force of the solenoid 28.

When the solenoid 28 is deactivated, the resulting force of the armature springs 30 and 32 forces the armature 26 downwardly whereby an additional force of the valve springs 14 and 12 will be added to this force after a minimal deflection so that the valve will move upwardly and the crank 22 will move through its vertical position in the clockwise direction to the left below the center point of the shaft 20. Upon further movement of the valve 4, the solenoid 28 is again activated so that the valve 4 is moved into its closed position in which the crank 18 is in a position pointing approximately vertically upwardly and the armature 26 is substantially in the same position which it has in the fully open position of the valve. When the valve is again opened, the aforementioned movements occur in the opposite direction.

Since the armature 26 is embodied as a solenoid plunger, a very high magnetic efficiency can be achieved because stray fields are substantially prevented. Since the armature 26 does not move into a position contacting the solenoid 36 and, instead, a gap remains, not only a hard mechanical contact is avoided, but also additional magnetic adhesive forces are avoided. This allows for a precise time control of the system by a non-represented electronic control device.

With an expedient selection of the length of the cranks and the connecting rods, the stroke of the armature 26 with respect to the magnetic force to be generated and the required conditions with regard to current value can be adjusted optimally and the valve stroke of the valve 4 can be selected according to the optimal conditions for operating the internal combustion engine. The spring systems 30, 32 as well as 12, 14 can be optimized substantially independent from one another.

With the disclosed system, the valve 4 can be opened against high pressure within the combustion chamber which is, for example, required when the valve 4 is an exhaust valve. This is possible because the leverage active on the armature in the closed position of the valve is substantially at a maximum level while the leverage for the valve in the closed position is substantially zero.

The disclosed system can be modified in multiple ways.

For example, the armature spring 32 can be eliminated so that only the armature spring 30, which forces the armature 26 away from the solenoid, is present.

The shaft for the crank 18 can be separate from the shaft for the crank 22 whereby the separation of the shafts requires a fixed coupling of the two shafts. This provides spacial degrees of freedom for certain design requirements.

Moreover, for certain applications the valve spring system 12, 14 can be eliminated and replaced by the armature spring system 30, 32 whereby the armature spring system 30, 32 must be designed such that the armature 26 moves under the effect of the springs from its secured position.

The arrangement of the solenoid 28 can be reversed in comparison to FIG. 1 so that the armature crank 22 moves between its two rest positions of the armature 26 above the shaft 20.

The direction of movement of the armature 26 must not be parallel to the valve 4. It is only important that the armature position 22 is substantially perpendicular to the direction of movement of the armature 26 when the valve crank 18 and the valve connecting rod 16 are positioned in the stretched or compressed position, i.e., in one of the dead center positions.

The disclosed system is suitable for use for any kind of valves and control members which are to be moved between two end positions.

Figure 2:
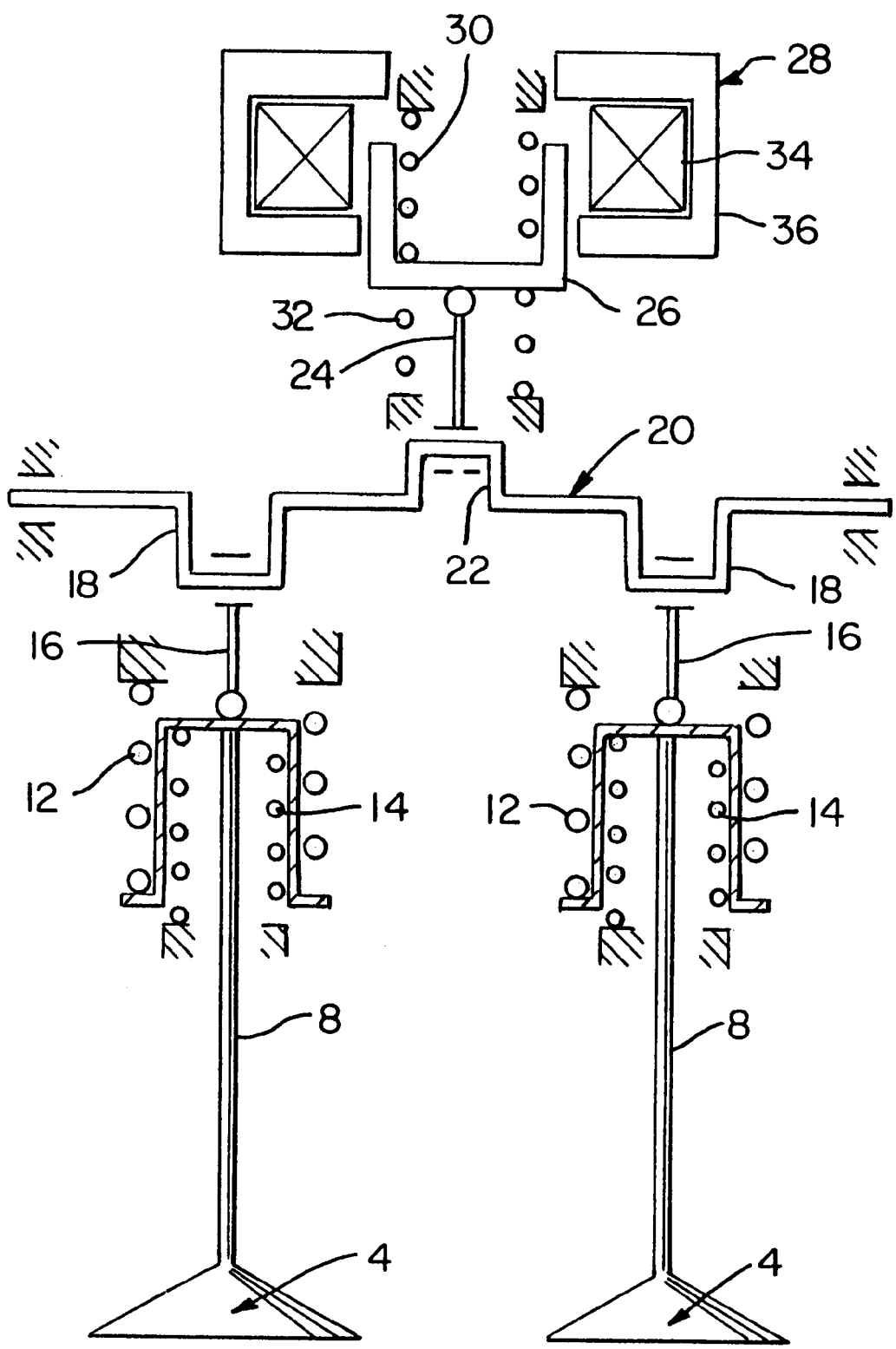
FIG. 2 a side view of the device according to FIG. 1.

FIG. 2 shows a front view of the arrangement according to FIG. 1. It is shown in addition to the illustration of FIG. 1 that the shaft 20 connected to the engine has a total of three connecting rod journals, a centrally arranged one that forms the armature crank 22 and two external ones forming the valve cranks 18. The connecting rods 16 are supported at the valve cranks 18. The armature connecting rod 24 is supported at the armature crank 22. The solenoid 28 provides simultaneous actuation of two valves 4. It is understood that the shaft 20 may have multiple journals (cranks) for actuation of more than the number of valves shown.

The cranks 18 or 22 can also be in the form of eccentric discs provided at the shaft 20 on which the connecting rods are supported.

Furthermore, it should be noted that the angle between the valve crank 18 and the armature crank 22, must not be 90°, as shown in FIG. 1. It is only important that the linkage system 18, 16 is in a stretched or compressed position while the linkage system 22, 24 is in a position that is bent by 90°. The angle between the valve cranks 18 and the armature crank 22 is thus freely selectable according to the spacial specifications.

Figure 3:
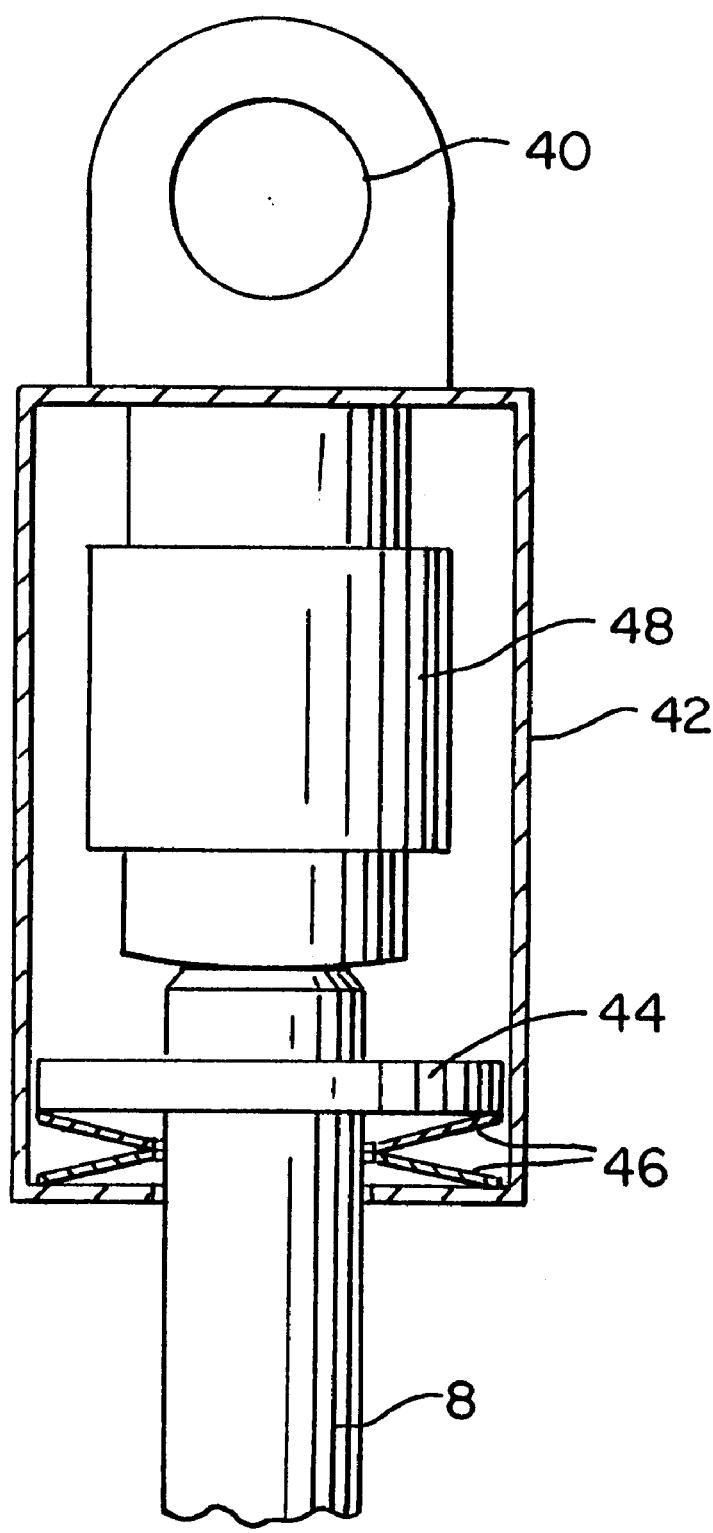
FIG. 3 a detail III of the device according to FIG. 1.

FIG. 3 shows a detail III of FIG. 1.

Advantageously, the system is provided with a hydraulic valve compensation which is represented in FIG. 3.

An eye 40, in which the valve stem 8 is supported within the valve connecting rod 16, is embodied as a unitary part of the housing 42 that surrounds a collar 44 which is embodied as a monolithic part of the actual valve stem 8. Between the collar 44 and the housing 42 two plate springs 46 are arranged. Between the end face of the stem 8 and the upper end of the housing 42, a hydraulic play compensation element 48 is provided which is supplied (not shown) with oil through the shaft 20, the crank 18, and the connecting rod 16.

The function of the play compensation element 48 is known to a person skilled in the art and therefore will not be disclosed in more detail in this context. In the closed position of the valve 4 (folded position of the components 16 and 18), the valve stem 8 is moved upwardly by the eye 40 so that the valve plate is in abutment at the seat. The spring plates 46 are thus compressed. The resulting play is received by the play compensation element 48 by its expansion due to hydraulic pressure.

Figure 4:
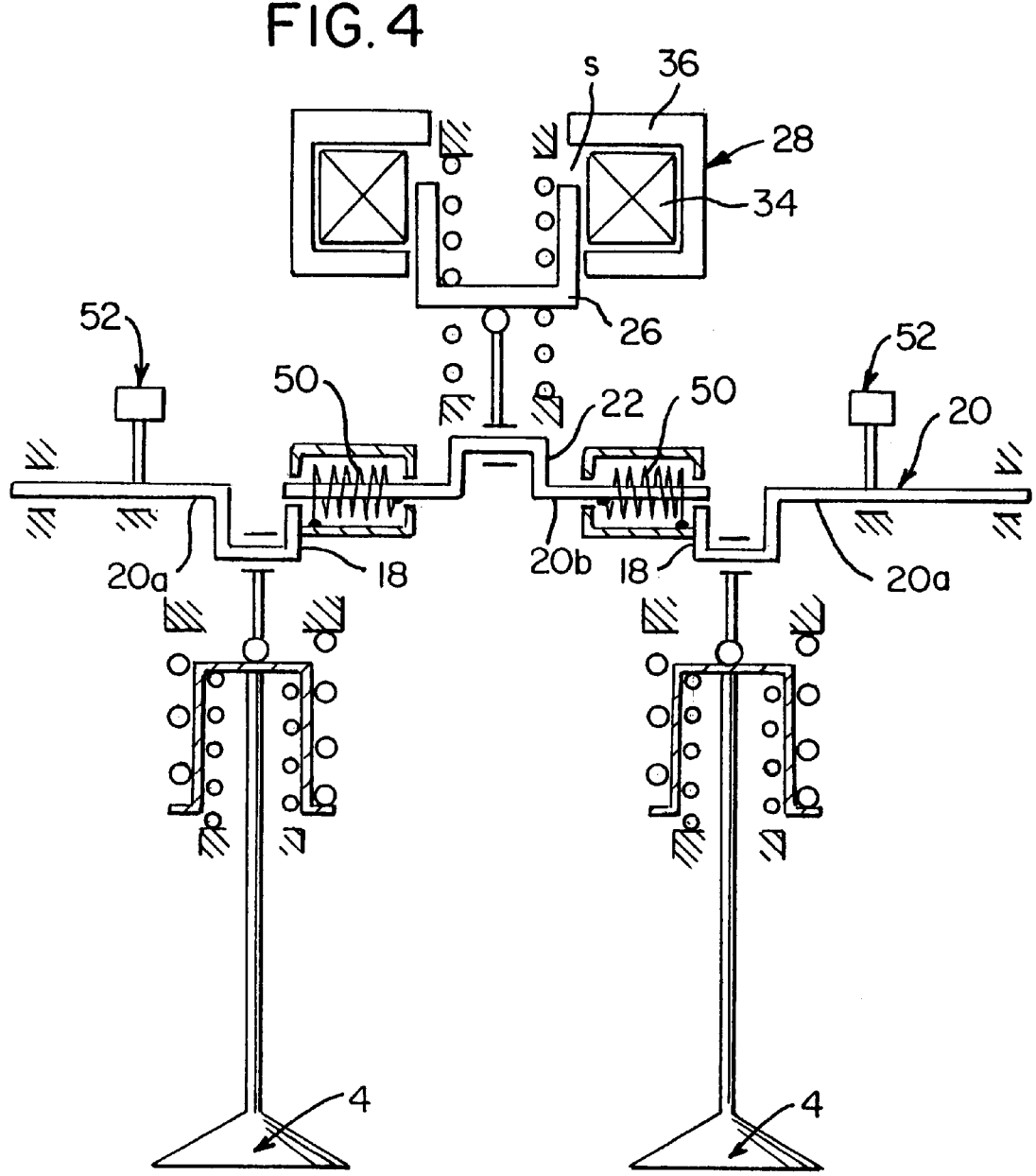
FIG. 4 a view similar to FIG. 2 of another embodiment.

FIG. 4 shows a further embodiment of the inventive device in the same view as shown in FIG. 2. Same parts are identified by same reference numerals as in FIG. 2.

In contrast to the embodiment according to FIGS. 1 and 2, the shaft 20 is divided and has two areas 28 coupled to the valves 4 and a central area 20b to which is connected the armature 26. Between the portions 20a and 20b torsional springs 50 are provided. Furthermore, for limiting the rotation of the shaft portions 20a, 20b, stops 52 are provided.

The function of the stops 52 is as follows.

As disclosed in connection with the description of the arrangement according to FIG. 1, the valve cranks 18 perform a pivot movement by about 180° between the closed position of the valves and the open position of the valves. The stops 52 have the effect that the armature cranks 22 cannot pivot past the respective dead center position, i.e., in the view according to FIG. 1, they can be moved from the represented position only in a vertical upward position or into a vertical downward position. The stops 52 can be levers that are fixedly connected to the shaft portions 20a which contact abutments provided at the motor housing, or can be embodied such that the armature cranks 22 will contact directly abutments, which are represented in dashed lines and indicated with reference numeral 52 in FIG. 1. These stops 52 thus define the fully opened position and the closed position of the valve or valves, i.e., the corresponding dead center position so that this position is maintained even when the solenoid 28 is excited with high currents.

The function of the torsion spring 50 is as follows.

It is assumed that the rotational position of the shaft portions 20a is respectively such that they are limited by the stops 52, i.e., the valve 4, for example, is in its fully closed position. When the torsion spring 50 is not twisted, a gap s is formed between the armature 26 and the solenoid core 36, as has been disclosed in regard to the discussion of FIG. 1. When the coil 34 is supplied with a strong current, the armature 26 is respectively more strongly attracted so that the gap s is smaller and the torsion spring 50 is twisted. When the solenoid 28 is activated from this state, the torsion of the torsional spring 50 is released additionally so that the valve 4 can be moved faster, respectively, with greater force out of its closed position. This effect can be used for an accelerated actuation of the valve 4 but also for overcoming pressures effective within the working or combustion chamber during opening of the valve. The same energy storage can also be employed when the valves are positioned in their fully open position.

The stops 52 can be provided without employing torsion springs 50 in the system. The torsion springs 50 can also be realized in that certain areas of the shaft 20 are twisted in a directed manner or that other suitable spring force storage devices are provided, such as pneumatic devices, hydraulic spring buffers etc.

The crank drive by which is the armature 26 drives the shaft 20, can be embodied in a non-represented alternative design by a linear drive, for example, in that the armature 26 drives by a toothed rack to a gear wheel connected fixedly to the shaft 20.

The specification incorporates by reference the disclosure of German priority document 198 35 402.9 of Aug. 5, 1998.

The present invention is, of course, in no way restricted to the specific disclosure of the specification and drawings, but also encompasses any modifications within the scope of the appended claims.

What is claimed is:

1. An electromagnetically operating valve actuating device, said device comprising a valve (4);

an actuating device (12, 14) engaging said valve (4), wherein said valve (4) and said actuating device (12, 14) together form an oscillating system, wherein said valve (4) in a rest position of said oscillating system is maintained between a fully open valve position and a closed valve position;

a solenoid system comprising an armature (26) and a solenoid (28) acting on said armature (26);

an armature connecting rod (24) connected to an armature crank (22) of a shaft (20);

a valve connecting rod (16) connected to a valve crank (18) of the shaft (20);

said armature (26) connected by said armature connecting rod (24), said armature crank (22) and said valve crank (18) of the shaft (20), and said valve connecting rod (16) to said valve (4);

said solenoid (28), when excited, pulling said armature (26) into a first end position in which said valve is in said fully opened valve position or closed valve position, wherein said valve (4) from said first end position in which it is magnetically secured, after switching off said solenoid system, is moved by said actuating device (12, 14) into a second end position in which it is again secured by said excited solenoid (26);

said valve crank (18) and said valve connecting rod (16) arranged such that a stretched position, in which said valve crank (16) extends said valve connecting rod (16), corresponds to said fully opened valve position of said valve (4) and that a folded position, in which said valve crank (18) shortens said valve connecting rod (16), corresponds to said closed position of said valve (4);

said armature crank (22) and said armature connecting rod (24) arranged such that in said fully open valve position and said closed valve position, said armature crank (22) and said armature connecting rod (24) substantially form a right angle at one or the other side of the shaft (20);

said armature crank (22) and said armature connecting rod (24), when said valve (4) moves from one of said first and second end positions (4) into the other of said first and second end positions, rotate through a dead center position so that said armature (26) is first moved away from said solenoid (28) and subsequently approaches said solenoid (28).

2. The device according to claim 1, wherein said actuating device (12, 14) is comprised of two oppositely acting springs (12, 14) directly engaging said valve (4) and wherein said solenoid system comprises a first armature spring (30) acting on a first side of said armature (26) so as to force said armature (26) out of said solenoid (28).

3. The device according to claim 2, wherein said solenoid system comprises a second armature spring (32) engaging a second side of said armature (26) opposite said first side, wherein said first and second armature springs (30, 32) are designed such that a balanced position of said first and second armature springs (30, 32) corresponds to a position of said armature (26) remote from said solenoid (28).

4. The device according to claim 1, wherein, when said solenoid (28) is not excited and said valve (4) is in said rest position, said armature connecting rod (24) and said armature crank (22) are not in said dead center positions.

5. The device according to claim 1, wherein, when said armature (26) is secured by said solenoid (28), a gap (s) is present between said armature (26) and a pole surface of said solenoid (28).

6. The device according to claim 1, wherein said solenoid system comprises a core (36) and wherein said armature (26) is embodied as a solenoid plunger received in a recess of said core (36).

7. The device according to claim 1, wherein said solenoid system (28) comprises a core (36) and a coil (34) surrounded by said core (36).

8. The device according to claim 1, further comprising stops (52) for limit a pivot range of said valve crank (18) to an angular distance of approximately 180° between said fully opened and closed valve position.

9. The device according to claim 5, further comprising an energy storage device (50) storing energy usable for moving said armature (26) farther from said first and second end positions to reduce said gap (2) by additional excitation of said solenoid system (28).

10. The device according to claim 9, wherein said energy storage device (50) is embodied as a torsion spring (50) positioned between a shaft portion (20*a*) connected to said valve crank (18) and a shaft portion (20*b*) connected to said armature crank (22).

11. The device according to claim 1, further comprising a valve compensation element (48) positioned between a valve stem (8) of said valve (4) and said valve crank (16).

12. The device according to claim 1, wherein the shaft (20) has eccentric discs (18) on opposed sides of said armature crank (22) whereby each one of said eccentric discs (18) forms one of said valve cranks (18) correlated with one of said valves (4).

* * * * *